(12) United States Patent
Bilcu et al.

(10) Patent No.: US 9,491,372 B2
(45) Date of Patent: Nov. 8, 2016

(54) APPARATUS AND METHOD COMPRISING A BEAM SPLITTER

(75) Inventors: Radu Ciprian Bilcu, Tampere (FI); Pekka Ayras, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 63 days.

(21) Appl. No.: 14/359,780

(22) PCT Filed: Nov. 23, 2011

(86) PCT No.: PCT/IB2011/055262
§ 371 (c)(1),
(2), (4) Date: May 21, 2014

(87) PCT Pub. No.: WO2013/076531
PCT Pub. Date: May 30, 2013

(65) Prior Publication Data
US 2014/0300795 A1    Oct. 9, 2014

(51) Int. Cl.
| | |
|---|---|
| *H04N 5/238* | (2006.01) |
| *G02B 27/10* | (2006.01) |
| *G02B 27/42* | (2006.01) |
| *H04N 5/225* | (2006.01) |
| *H04N 5/232* | (2006.01) |
| *H04N 5/235* | (2006.01) |

(52) U.S. Cl.
CPC .......... *H04N 5/238* (2013.01); *G02B 27/1066* (2013.01); *G02B 27/1086* (2013.01); *G02B 27/4272* (2013.01); *H04N 5/2258* (2013.01); *H04N 5/2353* (2013.01); *H04N 5/23232* (2013.01)

(58) Field of Classification Search
CPC .......... H04N 5/2258; H04N 5/23232; H04N 5/2353; H04N 5/238; G02B 27/1066; G02B 27/1086; G02B 27/4272
See application file for complete search history.

(56) References Cited

U.S. PATENT DOCUMENTS

| | | | |
|---|---|---|---|
| 4,005,285 A | 1/1977 | Price | 250/208 |
| 4,467,188 A * | 8/1984 | Suzuki | G02B 5/1814 250/204 |
| 4,591,256 A * | 5/1986 | Matsumura | G03B 3/10 359/572 |
| 5,054,884 A | 10/1991 | Kubota | 359/566 |
| 5,113,067 A * | 5/1992 | Nakai | H04N 1/488 250/208.1 |
| 5,386,228 A | 1/1995 | Okino | 348/218 |
| 5,998,796 A * | 12/1999 | Liu | G01N 27/44721 250/458.1 |
| 6,788,338 B1 | 9/2004 | Dinev et al. | 348/222.1 |

(Continued)

FOREIGN PATENT DOCUMENTS

| | | |
|---|---|---|
| EP | 0 973 019 A1 | 1/2000 |
| GB | 2 449 982 A | 12/2008 |
| WO | WO 2010/142338 A1 | 12/2010 |

OTHER PUBLICATIONS

Mitsunaga, Tomoo, et al., "Radiometric Self Calibration", © 1999 IEEE, 7 pgs.

(Continued)

*Primary Examiner* — Timothy J Henn
(74) *Attorney, Agent, or Firm* — Harrington & Smith

(57) ABSTRACT

An apparatus and method wherein the apparatus includes a beam splitter configured to split a beam of light into at least two split beams, such that the at least two split beams are incident on different imaging sensors, wherein the beam splitter includes at least one diffraction grating; and at least two imaging sensors configured to detect the at least two split beams.

20 Claims, 4 Drawing Sheets

(56) References Cited

U.S. PATENT DOCUMENTS

| | | | |
|---|---|---|---|
| 7,339,737 B2 | 3/2008 | Urey et al. ................... 359/566 |
| 7,772,533 B2 | 8/2010 | Brock et al. ................ 250/208.1 |
| 2002/0031783 A1* | 3/2002 | Empedocles .... G01N 33/54373 435/7.1 |
| 2002/0135825 A1* | 9/2002 | Lee ...................... G02B 5/1814 358/509 |
| 2005/0207011 A1* | 9/2005 | Ito ........................... G02B 5/18 359/569 |
| 2006/0221209 A1 | 10/2006 | McGuire et al. ............. 348/239 |
| 2006/0227322 A1* | 10/2006 | Kauffman ................ G01J 3/02 356/328 |
| 2009/0245730 A1 | 10/2009 | Kleemann ...................... 385/37 |
| 2010/0073499 A1 | 3/2010 | Gere .......................... 348/222.1 |
| 2010/0321688 A1 | 12/2010 | Bodkin et al. ................ 356/326 |
| 2010/0328780 A1 | 12/2010 | Tocci ........................... 359/636 |
| 2015/0277014 A1* | 10/2015 | Schrader ................ G03B 35/10 348/335 |

OTHER PUBLICATIONS

Kang, Sing Bing, et al., "High Dynamic Range Video", ACM Transactions on Graphics, 2003, 7 pgs.

Nayar, S.K., et al., "Adaptive Dynamic Range Imaging; Optical Control of Pixel Exposures Over Space and Time", © 2003 IEEE, 8 pgs.

Levola, T., "Diffractive optics for virtual reality displays", © 2006 Society for Information Display, 9 pgs.

Robertson, Mark A., et al., "Dynamic Range Improvement Through Multiple Exposures", © 1999 IEEE, 5 pgs.

Mase, Mitsuhito, et al., "A Wide Dynamic Range CMOS Image Sensor with Multiple Exposure-Time signal Outputs and 12-bit Column-Parallel Cyclic A/D Converters", © 2005 IEEE, 9 pgs.

Debevec, Paul E., et al., "Recovering High Dynamic Range Radiance Maps from Photographs", SIGGRAPH '97 Conference Proceedings, Aug. 1997, 10 pgs.

Aggarwal, M., et al., "Split Aperture Imaging for High Dynamic Range", © 2001 IEEE, 8 pgs.

Cheng, Samuel, et al., "Extended Depth-of-Field Microscope Imaging: MPP Image Fusion vs. Wavefront Coding", © 2006 IEEE, 4 pgs.

Nayar, S.K., et al., "High Dynamic Range Imaging: Spatially Varying Pixel Exposures", © 2000 IEEE, 8 pgs.

\* cited by examiner

APPARATUS AND METHOD COMPRISING A BEAM SPLITTER

TECHNOLOGICAL FIELD

Embodiments of the present disclosure relate to an apparatus and method. In particular, they relate to an optical apparatus and method which enable a plurality of different images of the same scene to be captured simultaneously.

BACKGROUND

Multi-frame imaging techniques which comprise capturing a plurality of images of the same scene, where each image has a different optical property, and then combining the plurality of images to produce a single, consolidated image are known.

For example, the dynamic range of digital image capturing devices may be improved by obtaining multiple images of the same scene where each image has a different exposure. The bright parts of the scene are represented in detail in the short exposed images and the dark parts of the scene are represented in detail in the longer exposed images. The multiple images can then be combined in order to obtain a single image with both high quality light areas and dark areas.

A similar technique may also be used to create images with multiple objects, at different focal lengths from the image capturing device, in focus. This technique comprises capturing multiple images focussed at different distances and then combining them to create a single image with different objects in focus.

A problem with these techniques is that if the multiple images are captured by the same imaging sensor then there is a time interval between capturing the multiple images. This may cause problems if there is movement within the scene or movement of the imaging device or of the user holding the imaging device.

An alternative system to this is to have multiple image sensors on the same imaging device, however the multiple sensors need to be separated spatially and so the different sensors do not see an identical scene. Therefore it is necessary to take the spatial separation of the image sensors into account when combining the images.

BRIEF SUMMARY

According to various, but not necessarily all, embodiments of the disclosure there is provided an apparatus comprising: a beam splitter configured to split a beam of light into at least two split beams, such that the at least two split beams are incident on different imaging sensors, wherein the beam splitter comprises at least one diffraction grating; and at least two imaging sensors configured to detect the at least two split beams.

In some embodiments the beam splitter may comprise a transparent plate comprising two substantially parallel surfaces. A first diffraction grating may be provided on a surface of the transparent plate where the first diffraction grating is configured to couple a beam of light into the transparent plate. At least two second diffraction gratings may be provided on a surface of the transparent plate to diffract the at least two split beams out of the transparent plate. The at least two second diffraction gratings may be provided on a different surface of the transparent plate to the first diffraction grating. The first diffraction grating and the second diffraction grating may have the same period.

In some embodiments of the disclosure the beam splitter may comprise an exit pupil expander.

In some embodiments of the disclosure the apparatus may further comprise at least one controller wherein the at least one controller may be configured to combine different images produced by the at least two imaging sensors to produce a single image.

In some embodiments of the disclosure the beam splitter may be configured so that each of the at least two split beams are incident on different imaging sensors.

In some embodiments of the disclosure the different imaging sensors may produce an image of the same scene where the different images have different optical properties. The different images may be captured using different exposure values. The different images may have different exposure times. The different images may be captured using different imaging sensors having different analogue gains. The different images may have different focal distances.

In some embodiments of the disclosure the at least two imaging sensors may have different optical properties. The at least two imaging sensors may have different resolutions. The at least two imaging sensors may have different sizes. The at least two imaging sensors may have different aspect ratios.

According to various, but not necessarily all, embodiments of the disclosure there is also provided a method comprising: splitting a beam of light into at least two split beams, using at least one diffraction grating, such that the at least two split beams are incident on different imaging sensors; and obtaining an image from the different imaging sensors.

In some embodiments of the disclosure the method may comprise coupling the beam of light into a transparent plate comprising two substantially parallel surfaces. The beam of light may be coupled into the transparent plate via a first diffraction grating. The method may also comprise diffracting the at least two split beams out of the transparent plate by at least two second diffraction gratings. The at least two second diffraction gratings may be provided on a different surface of the transparent plate to the first diffraction grating. The first diffraction grating and the second diffraction gratings may have the same period.

In some embodiments of the disclosure an exit pupil expander may be used to split the beam of light.

In some embodiments of the disclosure the method may further comprise combining different images produced by the at least two imaging sensors to produce a single image.

In some embodiments of the disclosure each of the at least two split beams may be incident on different imaging sensors.

In some embodiments of the disclosure different imaging sensors may produce an image of the same scene where the different images have different optical properties. The different images may be captured using different exposure values. The different images may have different exposure times. The different images may be captured using different imaging sensors having different analogue gains. The different images may have different focal distances.

In some embodiments of the disclosure the at least two imaging sensors may have different optical properties. The at least two imaging sensors may have different resolutions. The at least two imaging sensors may have different sizes. The at least two imaging sensors have different aspect ratios.

According to various, but not necessarily all, embodiments of the disclosure there is also provided an apparatus comprising: means for splitting a beam of light into at least two split beams, such that the at least two split beams are incident on different imaging sensors, wherein the means for splitting a beam of light comprises at least one diffraction grating; and means for obtaining an image from the at least two split beams.

The apparatus may be for capturing images.

BRIEF DESCRIPTION

For a better understanding of various examples of embodiments of the present disclosure reference will now be made by way of example only to the accompanying drawings in which.

DETAILED DESCRIPTION

The Figures illustrate an apparatus and method. The apparatus 1 comprises: a beam splitter 3 configured to split a beam of light 15 into at least two split beams 17A, 17B, such that the at least two split beams 17A, 17B are incident on different imaging sensors 31A, 31B, wherein the beam splitter 3 comprises at least one diffraction grating 7, 9; and at least two imaging sensors 31A,31B configured to detect the at least two split beams 17A, 17B.

The apparatus 1 may be part of an image capturing device such as a camera. The camera may be incorporated into an apparatus such as a mobile telephone or tablet computer or other electronic apparatus.

Figure 1:
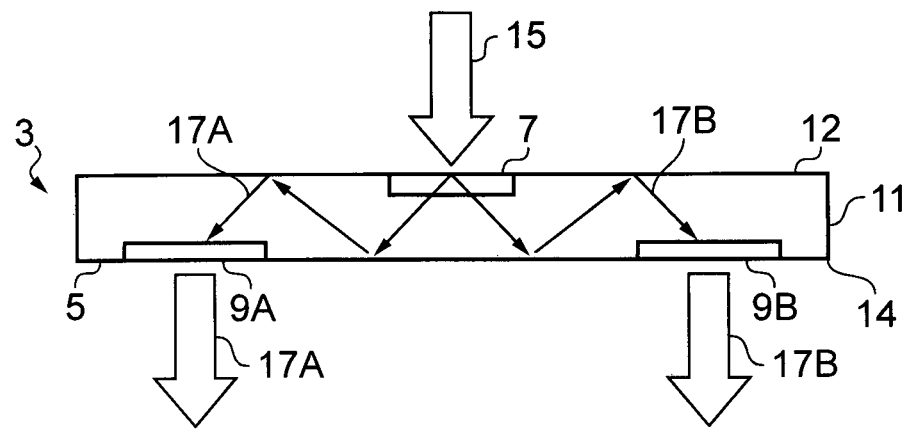
FIG. 1 illustrates an apparatus according to an examplary embodiment.

The apparatus 1 comprises a beam splitter 3. An examplary beam splitter 3 according to an embodiment of the disclosure is illustrated in FIG. 1. The beam splitter 3 may comprise any means which is configured to split an incident beam of light 15 into at least two split beams 17A, 17B and guide the at least two split beams 17A, 17B so that the at least two split beams 17A, 17B are incident on different imaging sensors 31.

The beam splitter 3 may be configured to split the incident beam of light 15 into a plurality of equivalent split beams 17. That is, each of the split beams 17 may be identical so that if each of the split beams 17 were incident on an identical imaging sensor an identical image would be obtained. Each of the split beams 17 may contain the same information.

In the examplary embodiment of FIG. 1 the beam splitter 3 comprises an exit pupil expander 5.

The exit pupil expander 5 comprises a transparent plate 11. The transparent plate 11 comprises two substantially parallel surfaces 12, 14. In the particular embodiment illustrated in FIG. 1 the transparent plate 11 is substantially flat. In other embodiments the transparent plate 11 may be curved or any other suitable shape.

The transparent plate 11 may be made of any suitable material which enables an incident beam of light 15 to be transmitted through the transparent plate 11. For example, the transparent plate 11 may be made of glass or plastic.

The thickness of the transparent plate 11 which is used may be dependent upon the width of the gratings which are used. In some embodiments of the disclosure the thickness of the transparent plate 11 may be between 1 to 1.5 mm.

A first diffraction grating 7 is provided on a first surface 12 of the transparent plate 11. The first diffraction grating 7 is an in-coupling grating which couples the incident beam of light 15 into the transparent plate 11. The first diffraction grating 7 may comprise any suitable periodic structure.

At least two, second diffraction gratings 9A, 9B are also provided. In the examplary embodiment illustrated in FIG. 1 the first diffraction grating 7 and the at least two, second diffraction gratings 9A, 9B are provided on different surfaces of the transparent plate 11. The at least two, second diffraction gratings 9A, 9B are provided on the second surface 14 of the transparent plate 11 which is parallel to the first surface 12.

In other embodiments of the disclosure the first diffraction grating 7 and the at least two, second diffraction gratings 9A, 9B may be provided on the same surface of the transparent plate 11. This may provide the benefit that it may be easier to accurately manufacture an exit pupil expander 5 having all of the diffraction gratings 7, 9 on the same surface of the transparent plate 11.

The at least two, second diffraction gratings 9A, 9B may comprise any suitable periodic structure. In some embodiments of the disclosure the at least two, second diffraction gratings 9A, 9B may have the same period as the first diffraction grating 7. This may enable some of the effects of the diffraction of the light by the first diffraction grating 7 to be cancelled out. For example, light of different wavelengths will be diffracted by different amounts by the first diffraction grating 7. This causes separation of the different colored light. This effect may be cancelled out by the diffraction caused by the at least two, second diffraction gratings 9A, 9B.

The at least two second diffraction gratings 9A, 9B are spatially separated from each other. Each of the split beams 17A, 17B which are diffracted out of the transparent plate by the at least two second diffraction gratings 9A, 9B are also spatially separated from each other.

In the examplary embodiment in FIG. 1 a beam of light 15 is incident on the first diffraction grating 7. The first diffraction grating 7 couples the incident beam of light 15 into the transparent plate 11. The first diffraction grating 7 splits the incident beam of light 15 into at least two split beams 17 as indicated by the arrows in FIG. 1. In the embodiment illustrated in FIG. 1 two split beams 17A, 17B travelling in substantially opposite directions are created. The first split beam 17A is directed towards the left hand side of the transparent plate 11 while the second split beam 17B is directed towards the right hand side of the transparent plate 11. The first split beam 17A and the second split beam 17B may correspond to the first negative diffraction order and the first positive diffraction order respectively.

The respective split beams 17A, 17B propagate through the transparent plate 11. The exit pupil expander 5 is configured to enable total internal reflection of the split beams 17A, 17B. In some embodiments the period and/or shape of the first diffraction grating 7 maybe selected to cause total internal reflection of the split beams 17A, 17B. This means that the split beams 17A, 17B remain inside the transparent plate 11 until they are incident upon one of the at least two second diffraction gratings 9A, 9B.

The at least two second diffraction gratings 9A, 9B diffract the at least two split beams 17A, 17B out of the transparent plate 11. This provides two spatially separated split beams 17A, 17B where each beam is equivalent to the other beams. As the split beams 17A, 17B originate from the same incident beam of light 15 the plurality of split beams 17A, 17B may be used to create a plurality of different images of the same scene. It is to be appreciated that if each of the spatially separated split beams 17A, 17B were incident on an identical imaging sensor then identical images would be formed.

Figure 2:
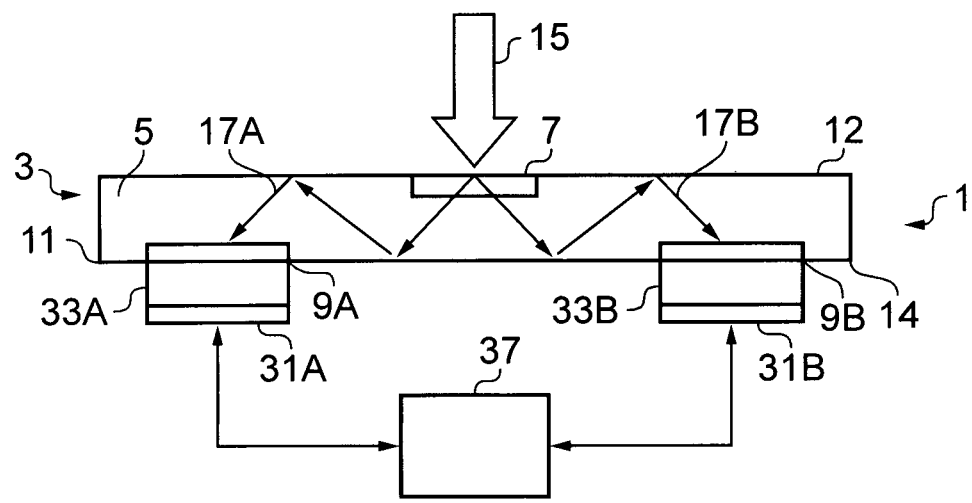
FIG. 2 illustrates an apparatus according to another examplary embodiment.

FIG. 2 illustrates an apparatus 1 according to an embodiment of the disclosure. The apparatus comprises a beam splitter 3 and at least two imaging sensors 31. In the embodiment illustrated in FIG. 2 a controller 37 is also provided.

The beam splitter 3 illustrated in FIG. 1 and described above may be used in the apparatus 1 illustrated in FIG. 2. The beam splitter 3 is configured to divide the incident beam of light 15 into at least two equivalent spatially separated split beams 17A, 17B.

The apparatus 1 comprises at least two imaging sensors 31A, 31B. The imaging sensors are configured so that different split beams 17 are incident on different imaging sensors 31. In some embodiments each split beam 17 may be incident on a different imaging sensor 31.

The image sensors 31 may comprise any means which can be used to convert an incident beam of light into an image. The image sensors 31 may comprise means for converting an incident beam of light into an electrical signal which can then be converted into an image. The image sensors 31 used in the apparatus 1, may comprise, for example, a digital CCD (charge coupled device) or a complementary metal-oxide-semiconductor (CMOS) sensor or any other suitable sensor. The image sensors 31 may be manufactured using any suitable technique.

In the examplary embodiment illustrated in FIG. 2 focusing lenses 33A, 33B are provided between the beam splitter 3 and the imaging sensors 31A and 31B. In the particular embodiment of FIG. 2 at least one focusing lens 31A, 31B is provided for each imaging sensors 31A, 31B. The focusing lenses may comprise any suitable optical devices which are configured to focus the split beams 17A, 17B onto the imaging sensors 31A, 31B.

The apparatus 1 also comprises a controller 37. The controller 37 may be implemented using instructions that enable hardware functionality, for example, by using executable computer program instructions in a general-purpose or special-purpose processor that may be stored on a computer readable storage medium (disk, memory etc) to be executed by such a processor. The apparatus 1 may therefore comprise: at least one processor; and at least one memory including computer program code. The at least one memory and the computer program code may be configured to, with the at least one processor, control the apparatus 1. The at least one memory and the computer program code may enable the apparatus 1 to create multiple images and then selectively combine the multiple images to create a single consolidated image.

The controller 37 may be configured to provide control signals to the imaging sensors 31. For example the controller 37 may be configured to control the exposure time of the imaging sensors 31 to obtain images with different exposures. In some embodiments the controller 37 may be configured to control the focal length of the focusing lenses 33 and imaging sensors 31 to obtain images with different parts of the same scene in focus.

The controller 37 may also be configured to receive input signals from the imaging sensors 31. The input signals may comprise electrical signals which may be used by the controller 37 to create digital images corresponding to the split beams of light detected by the imaging sensors 31.

In the examplary embodiment in FIG. 2 a beam of light 15 is incident on the first diffraction grating 7 of the beam splitter 3. The beam splitter 3 provides two spatially separated split beams 17A, 17B where each beam is equivalent to the other beams as described above.

The first split beam 17A is diffracted out of the beam splitter 3 via the diffraction grating 9A and passes through the first focusing lens 33A onto the first imaging sensor 31A to enable a first image to be created. The second split beam 17B, which is equivalent to the first split beam 17A but is spatially separated from it, is diffracted out of the beam splitter 3 via the diffraction grating 9B. The second split beam 17B then passes through the second focusing lens 33B onto the second imaging sensor 31B to enable a second image to be created. The two split beams 17A, 17B may be incident on the imaging sensors 31A, 31B simultaneously so that the first and second images are created at the same time.

The imaging sensors 31A, 31B and the focusing lenses 33A, 33B may be configured so that the images created by the imaging sensors 31A and 31$b$ are of the same scene but have different optical properties. As the split beams of light 17A, 17B are equivalent the images which are formed from the split beams of light 17A, 17B are of the same scene.

The optical properties of the images may be controlled by configuring each of the imaging sensors 31 and/or the focusing lenses 33 differently. For example, in some embodiments each of the imaging sensors 31A, 31B may be controlled to have a different exposure value. The first imaging sensor 31A may be configured to have a first exposure value and the second imaging sensor 31B may be configured to have a second exposure value which is greater than the first exposure value. In such embodiments the first imaging sensor 31A will produce an image in which the bright parts of the scene are represented in detail and the second imaging sensor 31B will produce an image in which the dark parts of the scene are represented in detail.

The exposure value may be a combination of the analogue gain of the imaging sensor 31 and the exposure time. The exposure value may be varied by varying one or both of the analogue gain of the imaging sensor 31 or the exposure time.

In some embodiments the different imaging sensors 31 may be configured to have different optical properties so that the images produced by the different imaging sensors have different characteristics. For example, the imaging sensors 31 may have different resolutions, different sizes or different aspect ratios or any other property which affects the optical properties of the images produced.

The controller 37 is configured to receive the different images of the same scene created by the different imaging sensors 31A, 31B. The controller 37 may then consolidate the different images to produce a single image with an improved dynamic range or a range of different objects in focus. As the images have been captured simultaneously there is no time delay between capturing the images and so the effect of movement within the scene or movement of the imaging device is minimised. Also the images are created from the same incident beam 15 and so there is no need to correct for the spatial separation of the image sensors 31. This makes it easier to consolidate the multiple images.

Figure 3:
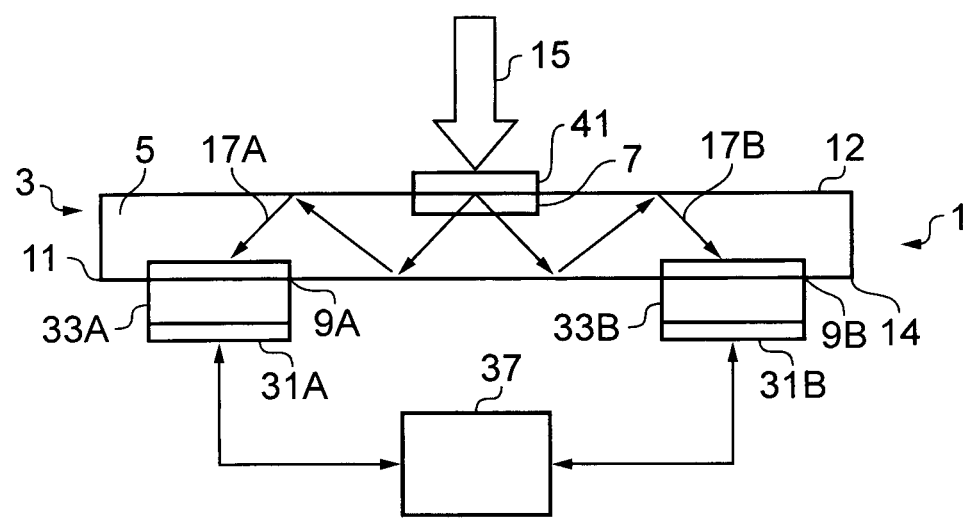
FIG. 3 illustrates an apparatus according to another examplary embodiment.

FIG. 3 illustrates an apparatus 1 according to another embodiment of the disclosure. The apparatus 1 of FIG. 3 is similar to the apparatus 1 illustrated in FIG. 2 and so the same reference numerals. However the apparatus 1 illustrated in FIG. 3 comprises a further focusing lens 41 configured to focus the incident beam of light 15 before it is incident on the first diffraction grating 7. The focusing lens 41 may be configured so that the incoming beam of light 15 is focused so as to optimize the splitting of the beam by the beam splitter 3. For example, the focusing lens 41 may be configured to focus the incoming beam of light 15 so that the object to be imaged by the incoming beam of light 15 appears to be located at an infinite distance from the beam splitter 3.

In other embodiments of the disclosure the lens 41 and the lenses 33A and 33B may be configured so that at least one of the image sensors 31A, 31B produces an image in which objects within the scene will be in focus.

In the above described embodiments the incident beam of light 15 is only split into two split beams 17A, 17B. It is to be appreciated that in other embodiments of the disclosure the incident beam of light 15 could be split into any number of spatially separated equivalent beams. The number of split beams 17 which are created depends upon the number of, and arrangement of, the diffractions gratings within the beam splitter 3.

Figure 4:
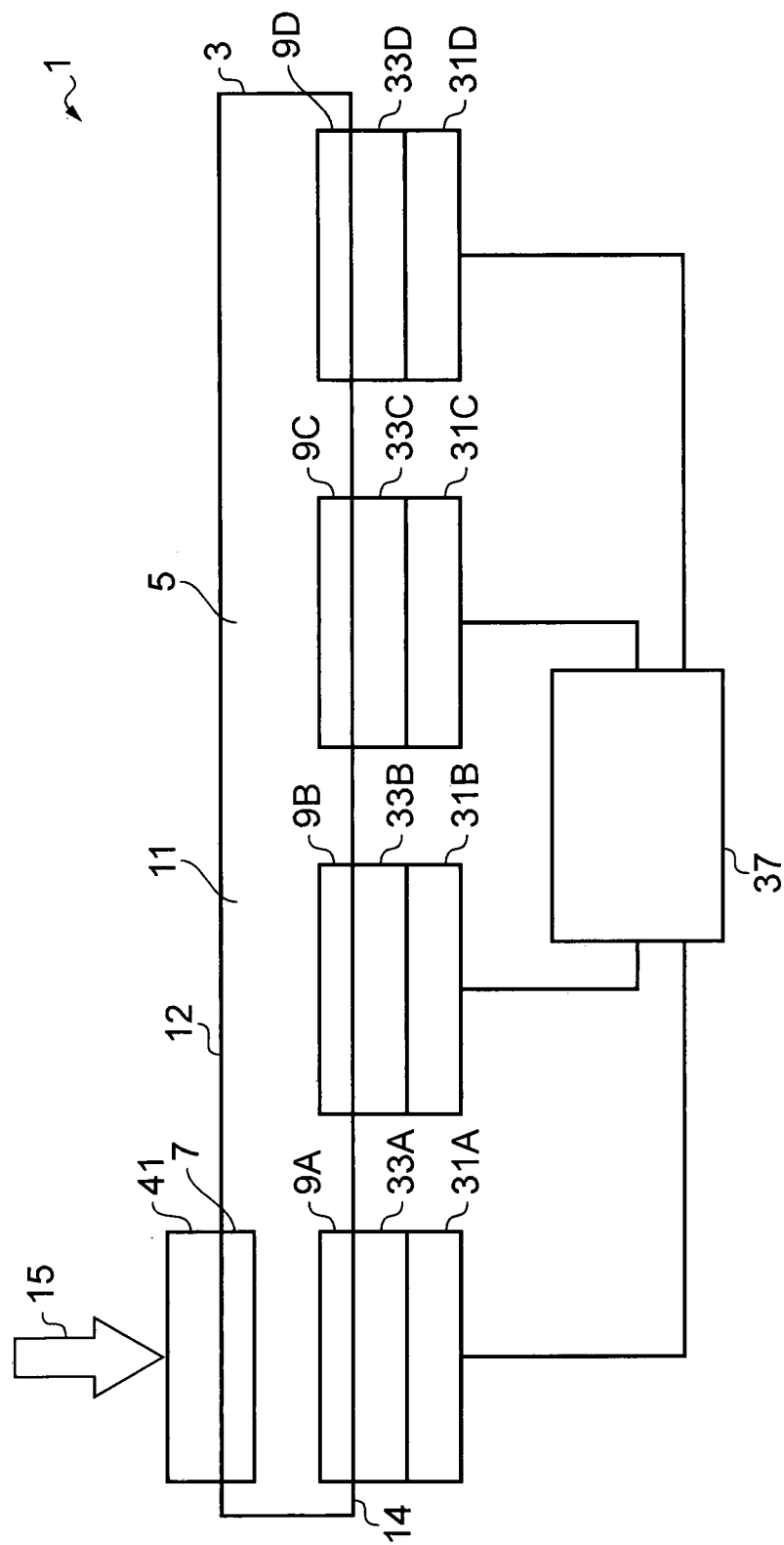
FIG. 4 illustrates an apparatus according to another examplary embodiment.

FIG. 4 illustrates an apparatus 1 according to a further embodiment of the disclosure. In this examplary embodiment the beam splitter 3 comprises an exit pupil expander 5 which is configured with four out-coupling diffraction gratings 9A, 9B, 9C and 9D. The four out-coupling diffraction gratings 9A, 9B, 9C and 9D enable the incident beam of light 15 to be split into four spatially separated split beams.

In this embodiment the respective out-coupling diffraction gratings 9A, 9B, 9C and 9D may differ from the previously described embodiments in that, in the previously described embodiments all of the light in the respective split beams 17 of light would be diffracted out through the first out-coupling grating in the path of the split beam 17. In the embodiment illustrated in FIG. 4 only a portion of the split beam 17 is diffracted out through the first out-coupling grating in the path of the split beam 17. This causes some of the light of the split beam 17 to be reflected back into the transparent plate 11. The rest of the split beam 17 may then be diffracted out by the second, third or fourth out-coupling diffraction gratings in the path of the split beam 17. This causes a plurality of spatially separated equivalent beams to be created.

Each of the four spatially separated split beams is incident on a different imaging sensor 31A, 31B, 31C and 31D. This enables four different images of the same scene to be captured simultaneously and so enables four different images to be consolidated into a single image. This enables four different exposure times or focal lengths to be used and so may provide for a higher quality consolidated image than the examplary embodiments of FIGS. 1 to 3.

Figure 5:
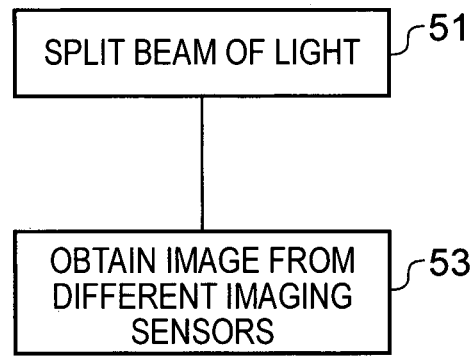
FIG. 5 illustrates a method according to an examplary embodiment.

FIG. 5 illustrates a method according to an examplary embodiment of the disclosure. The method comprises splitting, at block 51, a beam of light 15 into at least two split beams 17, wherein the beam splitter 3 which is used to split the beam of light 15 comprises at least one diffraction grating 7, 9. The splitting 51 of the beam of light 15 may use a beam splitter 3 similar to any of the apparatus 1 described above and illustrated in FIGS. 1 to 4. It is to be appreciated that, depending upon the configuration of the beam splitter 3 the beam of light 15 may be split into any number of equivalent beams.

The beam of light 15 is split so that the split beams 17 are incident on different imaging sensors 31. The imaging sensors 31 may be configured so that each of the split beams 17 are incident on different imaging sensors 31 so that each split beam 17 causes a different image to be created.

At block 53 an image is obtained from each of the different imaging sensors 31. Each image is of the same scene as each image is created by a split beam 17 originating from the same incident beam of light 15. Each image may have different optical properties, for example a different exposure time or to enable a high dynamic range to be created by consolidating the multiple images.

Although embodiments of the present disclosure have been described in the preceding paragraphs with reference to various examples, it should be appreciated that modifications to the examples given can be made without departing from the scope of the disclosure as claimed. For example in the above described embodiments the beam splitter 3 is described as comprising an exit pupil expander 5. It is to be appreciated that the diffraction gratings 7, 9 may be configured so that there is no expansion of the exit pupil so that the beam splitter 3 may be considered to comprise an exit pupil multiplier rather than an exit pupil expander. In other embodiments of the disclosure there may be some expansion of the exit pupil.

In the above described embodiments the apparatus comprises lenses 33, 41 configured to focus the respective beams of lights. In some other embodiments the transparent plate 11 may be curved or shaped so as to cause focussing of the respective beams of light.

In the embodiments described above the apparatus 1 is used to create images with a high dynamic range. It is to be appreciated that similar apparatus 1 could be used in other applications which require a plurality of images of the same scene to be captured. For example, the apparatus 1 may also be used in multi-frame auto-white balance techniques and multi-frame de-noising techniques or multi-focus images.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the disclosure believed to be of particular importance it should be understood that the Applicant claims protection in respect of any patentable feature or combination of features hereinbefore referred to and/or shown in the drawings whether or not particular emphasis has been placed thereon.

We claim:
1. An apparatus comprising:
a beam splitter configured to split a beam of light into at least two split beams, such that the at least two split beams are incident on different imaging sensors, wherein a first split beam of the at least two split beams comprises first information and a second split beam of the at least two split beams comprises first information; wherein the first information in the first spilt beam and the first information in the second split beam are identical; the beam splitter comprises at least one diffraction grating; and
at least two imaging sensors configured to detect the at least two split beams.

2. An apparatus as claimed in claim 1 wherein the beam splitter comprises a transparent plate comprising two substantially parallel surfaces.

3. An apparatus as claimed in claim 2 wherein a first diffraction grating is provided on a surface of the transparent plate where the first diffraction grating is configured to couple a beam of light into the transparent plate.

4. An apparatus as claimed in claim 2 wherein at least two second diffraction gratings are provided on a surface of the transparent plate to diffract the at least two split beams out of the transparent plate.

5. An apparatus as claimed in claim 4 where the at least two second diffraction gratings are provided on a different surface of the transparent plate to the first diffraction grating.

6. An apparatus as claimed in claim 4 where the first diffraction grating and the second diffraction grating have the same period.

7. An apparatus as claimed in claim 1 wherein the beam splitter comprises an exit pupil expander.

8. An apparatus as claimed in claim 1 further comprising at least one controller wherein the at least one controller is configured to combine different images produced by the at least two imaging sensors to produce a single image.

9. An apparatus as claimed in claim 1 wherein the beam splitter is configured so that each of the at least two split beams are incident on different imaging sensors.

10. An apparatus as claimed in claim 1 wherein different imaging sensors produce an image of the same scene where the different images have different optical properties.

11. An apparatus as claimed in claim 10 wherein the different images are captured using at least one of different exposure values, different exposure times, different analogue gains, different focal distances.

12. An apparatus as claimed in claim 1 wherein the at least two imaging sensors have at least one different optical properties, different resolutions, different sizes, different aspect ratios.

13. A method comprising:
splitting a beam of light into at least two split beams, using at least one diffraction grating, such that the at least two split beams are incident on different imaging sensors; wherein a first split beam of the at least two split beams comprises first information and a second split beam of the at least two split beams comprises first information; wherein the first information in the first split beam and the first information in the second split beam are identical; and
obtaining an image from the different imaging sensors.

14. A method as claimed in claim 13 comprising coupling the beam of light into a transparent plate comprising two substantially parallel surfaces.

15. A method as claimed in claim 14 wherein the beam of light is coupled into the transparent plate via a first diffraction grating.

16. A method as claimed in claim 14 comprising diffracting the at least two split beams out of the transparent plate by at least two second diffraction gratings.

17. A method as claimed in claim 16 where the at least two second diffraction gratings are provided on a different surface of the transparent plate to the first diffraction grating.

18. A method as claimed in claim 16 where the first diffraction grating and the second diffraction gratings have the same period.

19. A method as claimed in claim 13 wherein an exit pupil expander is used to split the beam of light.

20. A method as claimed in claim 13 further comprising combining different images produced by the at least two imaging sensors to produce a single image.

* * * * *

UNITED STATES PATENT AND TRADEMARK OFFICE
CERTIFICATE OF CORRECTION

| | | |
|---|---|---|
| PATENT NO. | : 9,491,372 B2 | Page 1 of 1 |
| APPLICATION NO. | : 14/359780 | |
| DATED | : November 8, 2016 | |
| INVENTOR(S) | : Bilcu et al. | |

It is certified that error appears in the above-identified patent and that said Letters Patent is hereby corrected as shown below:

In the Claims
Claim 1, Column 8, Line 54, "spilt" should be deleted and --split-- should be inserted.

Signed and Sealed this
Seventeenth Day of January, 2017

Michelle K. Lee
*Director of the United States Patent and Trademark Office*